Sept. 16, 1958     O. D. TAYLOR     2,851,807
ARTIFICIAL TREE CONSTRUCTION
Filed Jan. 3, 1956
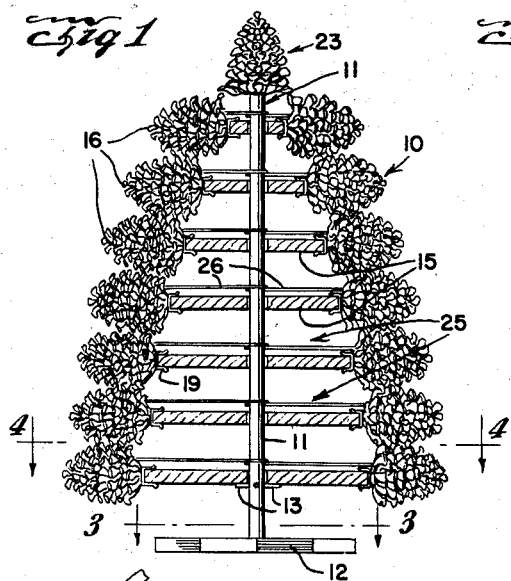
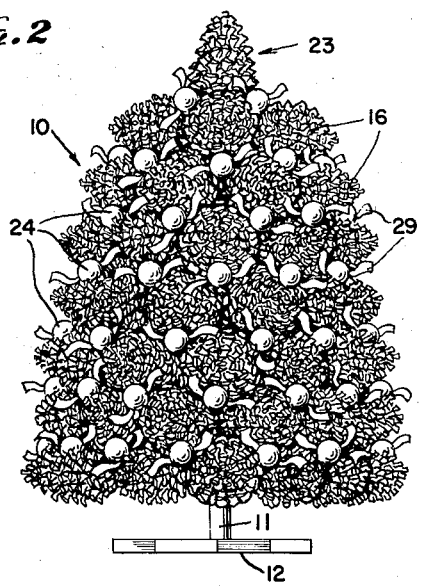
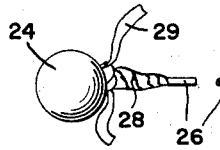
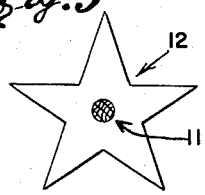
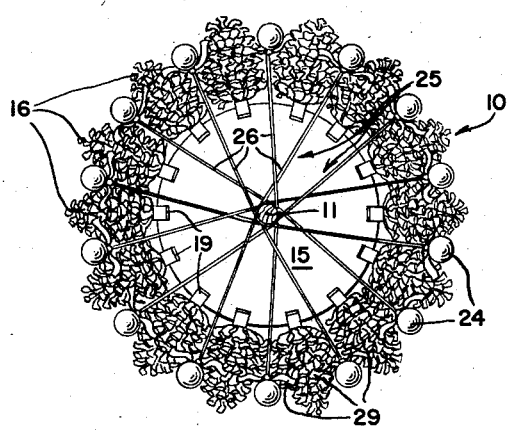
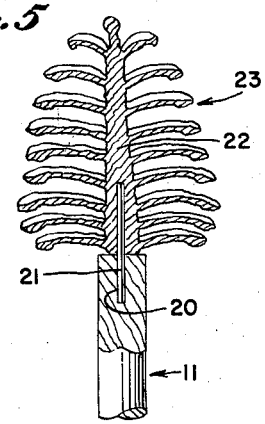
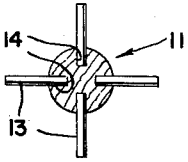
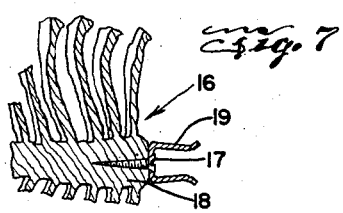
Owen D. Taylor
INVENTOR
BY
ATTORNEY

United States Patent Office 2,851,807
Patented Sept. 16, 1958

2,851,807

ARTIFICIAL TREE CONSTRUCTION

Owen D. Taylor, Dallas, Tex.

Application January 3, 1956, Serial No. 557,225

4 Claims. (Cl. 41—15)

This invention relates to miniature ornamental trees and more particularly to the art of fabricating such trees from normally unrelated materials.

The principal object of the invention is to provide a decorative novelty in the form of a miniature tree and to this end, pine cones are employed to simulate foliage, the cones being assembled in circumferential juxtaposition about the perimeters of a plurality of discs which are themselves assembled in vertically spaced relationship on a dowel representing the trunk of the tree, the said discs becoming progressively smaller in diameter toward the top of the trunk, which latter is supported on a base. Supplementing the pine cones are vari-colored glass spheres mounted on wire frames attached to the trunk and defining radial arms each carrying a sphere, thus to dispose the spheres of each frame between the tiers of pine cones to simulate fruit or to serve as ornaments if the fabricated tree is to be used as a Christmas decoration.

Other objects will appear as the description proceeds when considered with the annexed drawing, wherein:

Fig. 1 is a vertical sectional view of a simulated tree embodying the invention.

Fig. 2 is an elevational view.

Fig. 3 is a transverse sectional view taken on line 3—3 of Fig. 1.

Fig. 4 is a transverse sectional view taken on line 4—4 of Fig. 1.

Fig. 5 is a sectional view of the pine cone forming the apex of the tree and showing the trunk fragmentarily in part section.

Fig. 6 is a transverse sectional view of the trunk per se, showing the radial dowels for supporting the vertically shaped discs thereon.

Fig. 7 is a fragmentary sectional view of one of the pine cones showing an attaching clip thereon, and Fig. 8 is a fragmentary detail view of one of the wire frames for supporting tree ornaments.

Continuing with a more detailed description of the drawing, reference numeral 10 denotes generally the "foliage" of the simulated tree; 11, the "trunk" thereof and 12, the base on which the tree is supported.

The trunk of the tree consists of a rod or dowel, preferably wood, and is supported on the base 12 which is shown as being of star shape for decorative purposes only. A group of radially extending smaller dowels 13 (Fig. 6) are secured in holes 14 bored in the trunk 11 in circumferentially spaced relationship above the base 12. Supported on the trunk 11 by the group of dowels 13 is the lowest and largest of a plurality of discs 15. The discs 15 are also formed preferably of wood and are circular in shape with holes in their geometrical centers to receive the trunk 11. The discs are progressively smaller in diameter from the lowest to the highest disc to represent the natural appearance of a tree, especially a pine tree.

The "foliage" 10 of the tree is represented by a multiplicity of natural pine cones 16. Attached by means of a screw 17 (Fig. 7) or its equivalent, to the base 18 of each of the cones 16 is a substantially U-shaped spring steel clip 19. The clips 19 are clamped onto the perimeter of each of the discs 15 in such close adjacency as to dispose the pine cones 16 of each disc in circumferential contiguity, such contiguity in the vertical plane being assured by the close spacing of the cone mountings or discs 15.

The trunk 11 has an axial bore 20 (Fig. 5) extending a short distance into its upper end to receive one end of a small dowel 21. The opposite end of the dowel 21 extends into the core 22 of a pine cone 23 which constitutes the apex of the tree.

As a simulated fruit or ornamentation, a plurality of glass balls or spheres 24 are carried by wire frames, generally indicated by reference numeral 25 in Figs. 1 and 4 and so arranged in relation to the cones 16 that a circumferential row of these balls will lie between the tiers of cones, as shown.

Each wire frame 25 is composed of a length of wire 26 (Fig. 8) to one end of which is attached a glass ball 24 while its opposite end is formed into a loop 27 to receive the trunk 11. That part of the wire next adjacent the ball 24 may be wrapped with aluminum foil 28, if desired. Moreover, to suggest leaves or for additional ornamentation, bows 29 of colored ribbon may be tied about the foil wrapped portions of the wire 26, as shown.

In assembling the various parts on the stem or trunk 11, the largest disc 15 is first placed thereon and is supported on the radial dowels 13. A group of pine cones 16 are there arranged about the perimeter of the lowest disc 15, the pine cones being applied singly, one against the other and held thereon by their clips 19. Cones 16 are attached to the next highest disc 15 in like manner and the assembly is lowered on the trunk 11 to come to rest on the first assembly of cones. The succeeding cone and disc assemblies are placed on the trunk 11 until the highest assembly is in place, each supporting the others from the bottom support afforded by the dowels 13.

As each cone and disc assembly is placed on the trunk 11, the wire frames 25 are assembled on the trunk to extend radially therefrom in order that the vari-colored glass spheres 24 will lie between the tiers of pine cones 16, as shown. Of course, as the tree becomes smaller in diameter towards its apex, the wires 26 become proportionately shorter and by virtue of the flexibility of the wires 26, the balls 24 may be manipulated between the cones of each tier to fill such open spaces that may occur in the cone assemblies.

After the highest cone assembly is in place and the glass spheres arranged thereon, as specified, the apex cone 23 is mounted on the extreme top of the trunk 11, as shown in Fig. 5.

The simulated tree is primarily designed as a Christmas decoration and may be dismantled and stored for reuse each year. However, it is clearly evident that the pine cones and glass spheres may be substituted by other suitable media without altering to any material degree the mounting assembly shown and described, hence any changes and modifications which remain within the scope of the annexed claims is considered to be within the spirit and intent of the invention.

What is claimed is:

1. As a new article of manufacture, a simulated tree comprising a base, an upright trunk on said base, a plurality of discs having central openings receiving said trunk and disposed thereon at vertically spaced intervals, said discs becoming progressively smaller in diameter toward the top of said trunk, a group of pine cones disposed in juxtaposition about the perimeter of each of said discs, a clip carried by each pine cone clampingly engaging the perimeter of said disc at spaced intervals, a plurality of wire frames, each having a loop engaging said trunk and extending radially therefrom above each disc, an ornament carried by the outer end of each of said wire frames, said ornaments being disposed between adjacent groups of cones on said discs and a pine cone attached to and extending upwardly from the top of said trunk defining the apex of said tree.

2. As a new article of manufacture, a simulated tree comprising a base, an upright dowel supported on said base and simulating a trunk, a plurality of discs mounted on said trunk one above the other, a group of pine cones attached to the perimeter of each of said discs in relative contiguity, a plurality of wires having their inner ends attached to said trunk adjacent each of said discs, ornaments carried by the outer ends of said wires and adapted to be disposed between the groups of pine cones attached to said discs and means on said trunk supporting the lowest of said plurality of discs.

3. The structure of claim 2 in which said discs are progressively smaller in diameter from the lowest to the highest of said discs and said wires progressively shorter in length from the bottom to the top of said tree to correspond to the differences in diameter of said discs.

4. The structure of claim 2 in which all but the lowest of said discs is supported by the groups of cones attached to their perimeters.

References Cited in the file of this patent

UNITED STATES PATENTS

| | | |
|---|---|---|
| 1,773,824 | Scheibner | Aug. 26, 1930 |
| 2,309,977 | Peroni | Feb. 2, 1943 |
| 2,325,191 | Mortimer | July 27, 1943 |